US009903616B2

(12) United States Patent
Chueh et al.

(10) Patent No.: US 9,903,616 B2
(45) Date of Patent: Feb. 27, 2018

(54) COMPLEXED NANOPARTICLE MATERIAL, COMPOSITION AND USE COMPRISING THE SAME FOR HEATING LIQUID

(71) Applicant: National Tsing Hua University, Hsinchu (TW)

(72) Inventors: Yulun Chueh, Hsinchu (TW); Yuting Yen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 559 days.

(21) Appl. No.: 14/569,459

(22) Filed: Dec. 12, 2014

(65) Prior Publication Data

US 2016/0091224 A1    Mar. 31, 2016

(30) Foreign Application Priority Data

Sep. 25, 2014  (TW) .............. 103133168 A

(51) Int. Cl.
| | |
|---|---|
| *H01B 1/08* | (2006.01) |
| *B01D 17/00* | (2006.01) |
| *F24J 2/48* | (2006.01) |
| *C09K 5/14* | (2006.01) |
| *H01B 1/06* | (2006.01) |
| *B01D 17/02* | (2006.01) |
| *B01D 17/04* | (2006.01) |

(52) U.S. Cl.
CPC ............ *F24J 2/48* (2013.01); *B01D 17/0202* (2013.01); *B01D 17/047* (2013.01); *C09K 5/14* (2013.01); *H01B 1/06* (2013.01); *H01B 1/08* (2013.01); *Y02E 10/40* (2013.01)

(58) Field of Classification Search
CPC ..... H01B 1/00; H01B 1/06; H01B 1/08; F24J 2/00; F24J 2/48; B01D 17/00; B01D 17/0202; B01D 17/047
See application file for complete search history.

(56) References Cited

U.S. PATENT DOCUMENTS

2012/0104325 A1* 5/2012 Talapin ................. B82Y 30/00
                                                                252/502
2013/0200313 A1   8/2013 Fox et al.

OTHER PUBLICATIONS

Katerski et al "Modification of light absorption in films by sprayed Au nanoparticles", Nanoscale Research Letters 2014, 9, 494 (Year : 2014).*

(Continued)

*Primary Examiner* — Mark Kopec
(74) *Attorney, Agent, or Firm* — Mintz Levin Cohn Ferris Glovsky and Popeo, P.C.; Peter F. Corless; Joohee Lee

(57) ABSTRACT

The present invention relates to complexed nanoparticle materials including metal sub-nanoparticles and chalcopyrite nano cores. The metal sub-nanoparticles are distributed on the surfaces of chalcopyrite nano cores. The complexed nanoparticle materials have improved light absorption property because the surface plasmon resonance of metal nanoparticle to effectively convert light into thermal energy. The complexed nanoparticle materials further include dispersants which are attached on the surface of the complexed nanoparticle materials. A solvent mixture with similar polarity can be separated by adding the complexed nanoparticle materials with dispersants, and then irradiating sunlight through a focusing component to the solvent mixture.

26 Claims, 3 Drawing Sheets

(56) References Cited

OTHER PUBLICATIONS

Pol et al "Sonochemical deposition of silver nanoparticles on silica spheres", Langmuir 2002, 18, 3352-3357. (Year: 2002).*
Castro et al "Colloidal CuInS2 Nanoparticles for Polymeric Solar Cell", 2nd International Energy Conversion Engineering COnference Aug. 16-18, 2004. (Year: 2004).*

* cited by examiner

COMPLEXED NANOPARTICLE MATERIAL, COMPOSITION AND USE COMPRISING THE SAME FOR HEATING LIQUID

CROSS-REFERENCES TO RELATED APPLICATIONS

This application claims under 35 U.S.C. § 119(a) the benefit of Taiwanese Application No. 103133168, filed Sep. 25, 2014, the entire contents of which is incorporated herein by reference.

TECHNICAL FIELD

This present invention relates to complexed nanoparticle materials, and, more specifically, to a chalcopyrite complexed nanoparticle material.

BACKGROUND

The chalcopyrite material has a high absorption coefficient and high radiation stability in the solar spectrum, and is considered as a high potential solar photovoltaic element material in the future. As disclosed in U.S. 2013/0200313A1, it is known that the surface of chalcopyrite nano cores can be covered with other material to form a composite core-shell material. It is also disclosed that the material is used for solar photovoltaic element.

On the other hand, in the present petrochemical industry, the process used for separating and purifying nonpolar solvent normally takes a huge amount of energy to distill, and most of the energy dissipates as waste heat. Therefore, the relative conversion efficiency is low.

Consequently, how to provide a novel technology and a method to achieve the purpose of separating a solvent with a low energy cost and higher relative conversion efficiency, in fact, has become anxious to resolve the issue.

SUMMARY

The present invention provides a complexed nanoparticle material, which comprises a plurality of chalcopyrite nano cores and a plurality of metal sub-nanoparticles distributed on surfaces of the chalcopyrite nano cores. Compared with mere chalcopyrite nano cores, the complexed nanoparticle material according to the present invention is able to convert light into thermal energy more effectively by its improved light absorption property, because the metal sub-nanoparticles can have the surface plasmon resonance to the incident light and transfer the energy to the chalcopyrite nano cores.

The complexed nanoparticle material according to the present invention further comprises dispersants attached on the surface of the complexed nanoparticle material.

The present invention further provides a use of the above complexed nanoparticle material, which is used to heat liquid, for example, used for seawater desalination.

The present invention further provides a use of the above complexed nanoparticle material, which is used to separate a solvent mixture.

The heating process of the solvent mixture comprises the following steps:
adding the above complexed nanoparticle material into the solvent mixture; and irradiating and heating the solvent mixture including the above complexed nanoparticle material to its boiling point with light passing through a focusing component, so as to separate at least one of the solvents by distillation.

In an embodiment, the surfaces of the complexed nanoparticle material are further attached with dispersants. The solvent desired to be separated can be distilled and separated first by utilizing the selection of the polarity of the dispersant. Moreover, by taking advantage of the improved light absorption property of the metal sub-nanoparticles and the chalcopyrite nano cores, adding a few (0.05%) of the complexed nanoparticle material is able to effectively covert the incident light into thermal energy, so as to heat the solvent surrounding the complexed nanoparticle material and generate huge amount of solvent vapor to separate the solvent. The present invention utilizes the complexed nanoparticle material and further attaches the dispersants onto the surfaces of the material, so two solvents with similar boiling points can be distilled and separated by irradiating sunlight through a focusing component on the two solvents. By choosing the dispersants with different polarities, for example, the polarity of the added dispersant is relatively close to the polarity of the solvent desired to be separated, it makes the complexed nanoparticle material prone to distribute close to the polarity to be separated, so as to separate the solvent having similar polarity to the polarity of the dispersant. In addition, as long as the added dispersant is not vaporized during the heating process, it will not contaminate the product. The present invention can utilize the solar power to purify and separate solvents and take advantage of its property which effectively convert the solar energy to thermal energy and generate solvent vapor, so as to significantly reduce the power consumption and time cost.

DETAILED DESCRIPTION

Figure 1:
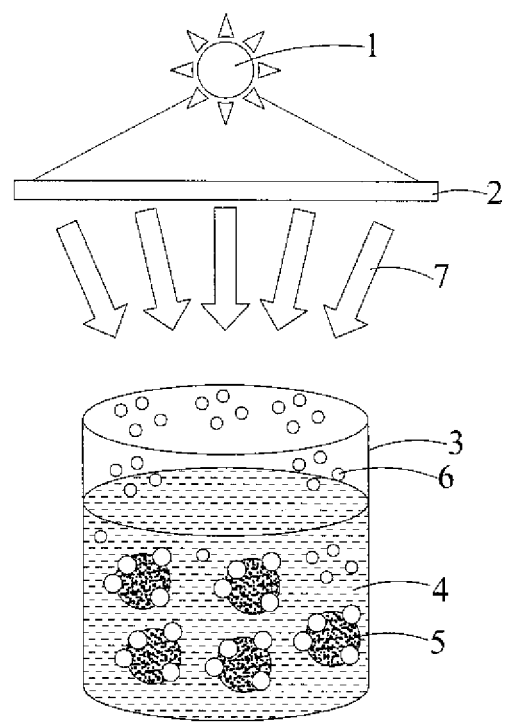
FIG. 1 is a schematic diagram of a device used to separate solvents.

The detail description of the disclosure is described by specific embodiments in the following. Those with ordinary skills in the arts can readily understand the advantages and functions according to the present invention after reading the disclosure of this specification.

The complexed nanoparticle material according to the present invention comprises a plurality of chalcopyrite nano cores and a plurality of metal sub-nanoparticles distributed on the surfaces of chalcopyrite nano cores. Preferably, the metal sub-nanoparticles are inlaid on the surfaces of chalcopyrite nano cores.

In an embodiment, the metal sub-nanoparticles absorb the visible light with the wavelength from 500 nm to 600 nm Preferably, the metal sub-nanoparticles are at least one selected from the group consisting of platinum, silver, and gold nanoparticles.

The term "chalcopyrite nano cores" can be the nanoparticles or the like shown in formula $I-III-VI_2$, wherein I represents the elements of Group 11 in the periodic table (Cu, Ag, or Au), III represents the elements of Group 13 in the periodic table (B, Al, Ga, In or Ti), and VI represents the elements of Group 16 in the periodic table (O, S, Se, Te or Po). The formula I-III-VI$_2$ can be, for example, CuInS$_2$, CuInSe$_2$, Cu(In,Ga)S$_2$, Cu(In,Ga)Se$_2$, CuGaSe$_2$, or AgInS$_2$, and the like can be, for example, Cu$_2$ZnSnS$_4$ or Cu$_2$ZnSnSe$_4$. Therefore, the chalcopyrite nano cores are at least one selected from the group consisting of CuInS$_2$, CuInSe$_2$, Cu(In,Ga)S$_2$, Cu(In,Ga)Se$_2$, CuGaSe$_2$, AgInS$_2$, Cu$_2$ZnSnS$_4$ and Cu$_2$ZnSnSe$_4$.

The phrase "the metal sub-nanoparticles are distributed on the surface of chalcopyrite nano cores" means that there are a plurality of the metal sub-nanoparticles on the surfaces of chalcopyrite nano cores. The distribution of the metal sub-nanoparticles is usually discontinuous. The phrase "the metal sub-nanoparticles are inlaid on the surface of chalcopyrite nano cores" means that there are spaces such as a plurality of recesses on the surface of chalcopyrite nano cores, so as to let the metal sub-nanoparticles inlaid and fixed.

In an embodiment, 54% to 64% (an area covered ratio) of the surface of chalcopyrite nano cores is covered by metal. The area covered ratio=(the surface area of chalcopyrite nano cores occupied by the metal sub-nanoparticles/the surface area of chalcopyrite nano cores)×100%. "The surface area of chalcopyrite nano cores" is represented by the circumference of a single chalcopyrite nano core of the complexed nanoparticle material in the TEM image. "The surface area of chalcopyrite nano cores occupied by the metal sub-nanoparticles" is represented by sum of the arc of the chalcopyrite nano core contacted with each of the metal sub-nanoparticles of a single complexed nanoparticle.

The diameter of the chalcopyrite nano cores according to the present invention can be ranged from 1 nm to 100 nm, and preferably from 5 nm to 15 nm The diameter of the metal sub-nanoparticles according to the present invention can be ranged from 1 nm to 50 nm, and preferably from 2 nm to 8 nm Preferably, the diameter of the chalcopyrite nano cores is larger than the diameter of the metal sub-nanoparticles. For example, when the diameter of the chalcopyrite nano cores is 5 nm, the diameter of the metal sub-nanoparticles is between 2 nm and 5 nm When the diameter of the chalcopyrite nano cores is 15 nm, the diameter of the metal sub-nanoparticles is between 2 nm and 15 nm.

The diameter of the complexed nanoparticle material according to the present invention can be ranged from 1 nm to 100 nm, can be ranged from 7 nm to 23 nm The complexed nanoparticle material within the diameter range is easier to uniformly distribute in a solution, so as to form a colloid solution and not to precipitate easily.

The complexed nanoparticle material according to the present invention can further comprise dispersants, which are attached on the surface of the complexed nanoparticle material. The present invention incorporates the dispersants with suitable solution to fabricate the complexed nanoparticle material. The surface of the fabricated complexed nanoparticle material is attached with the dispersants.

The term "dispersant" means the material having the following properties at the same time: it is able to be close to the surface of the complexed nanoparticle material to make the surface of the complexed nanoparticle material have a stationary phase, so as to avoid the recondensation of the particle material; it makes the nanoparticle material miscible with the liquid.

In an embodiment, the dispersants can be organic solvents, such as hexane, dichlorobenzene, and oleic acid.

The present invention further provides a use of the above complexed nanoparticle material, which is used to heat liquid. Adding the complexed nanoparticle material according to the present invention into liquid and then irradiating and heating the liquid including the complexed nanoparticle material with light passing through a focusing component can effectively convert the light energy to thermal energy by taking advantage of the improved light absorption property and can heating the liquid around the nanoparticle material.

The present invention further provides a use of the above complexed nanoparticle material, which is used to separate a solvent mixture. The solvent mixture includes at least two solvents and at least one of the solvents is distilled and separated after heating the solvent mixture to its boiling point.

Heating the solvent mixture comprises the steps of: adding the complexed nanoparticle material into the solvent mixture, and irradiating and heating the solvent mixture including the complexed nanoparticle material to its boiling point with light passing through a focusing component, so as to separate at least one of the solvents by distillation.

As the schematic diagram of a device used to separate solvents shown in FIG. 1, the solvent mixture 4 is placed in a container 3. The material of the container 3 is at least partially transparent for light irradiation, or the structure design of the container 3 allows the light from the light source coming in to irradiate the solvent mixture 4, so that the present invention can be implemented.

Heating the solvent mixture 4 comprises adding the composition having the complexed nanoparticle material 5 according to the present invention into the solvent mixture 4 having at least two solvents; and letting light 1 pass through the focusing component 2 to obtain the focused light 7, wherein the focused light 7 irradiates the solvent mixture 4 including the composition according to the present invention to generate solvent vapor 6, so as to separate at least one of the solvents by distillation.

For the selection of the dispersant to the heating of liquid as example, when heating the liquid, the liquid is a mixture including liquid medium, such as seawater. The boiling point of the liquid medium is lower than the other compositions in the mixture, such as metal elements or ions. Thus, compared with the other compositions in the mixture, the polarity of the dispersant should be close to the liquid medium, i.e., close to the polarity of water.

It is preferably to select the dispersants having similar polarity to the solvent that is desired to be separated. Through the function of the dispersants, the complexed nanoparticle material not only overcomes the gravity effect to distribute in the solvent, but is also prone to distribute near the solvent which is desired to be separated. When the complexed nanoparticle material absorbs optical energy and releases thermal energy, the solvent having similar polarity with the dispersant can be separated. The dispersants can be common polar or nonpolar dispersants, and the suitable dispersant can be selected based on the polarity of the solvent. In an embodiment, the polar dispersants are selected from sodium citrate, aminosilanes, mercaptosilanes, thioglycolic acid, and so on. In an embodiment, the nonpolar dispersants are selected from oleylamine, oleic alcohol, oleic acid, and so on.

The term "light" (or "light source") means any source can emit light, for example, sun light, solar simulated light, light bulb light, laser and so on. The present invention converts the energy of the light to thermal energy, and these light sources can be utilized individually or in combination.

The term "focusing component" means any component being able to focus light, for example, convex lens, parabolic minor, cylindrical minor, and so on. These focusing components can be utilized individually or in combination.

In an embodiment, after adding the compositions according to the present invention into the solvent mixture to be separated and letting the light pass through the focusing component, the light irradiates the solvent mixture including the compositions according to the present invention. When the complexed nanoparticle material absorbs optical energy and releases thermal energy, it can make the solvent mixture to be boiled, so that the solvent having similar polarity with the dispersant can be separated. The composition is 500 mg to 10,000 mg per liter of the liquid. Preferably, when the solvent mixture to be separated reaches 4.5 J/mL, one can boil the solvent mixture to be separated, so as to distill separate the solvent having similar polarity with the dispersant by distillation.

When the composition according to the present invention for heating liquid to separate solvent, only a small amount of the complexed nanoparticle material need to be added into the solvent mixture. By letting the sun light pass through the focusing component to heat the solvent mixture, the solvent can be separated without other energy consumption, so the separation cost is very low. In addition, because the complexed nanoparticle material having the property of high boiling point, and both the chalcopyrite nano cores and the metal sub-nanoparticles are stable material, the complexed nanoparticle material will not dispread to the distillation to cause contamination, during the process of heating and separating the solvent.

The complexed nanoparticle material can be stably preserved for more than six months, and can be repeatedly used in the method of separating the solvent mixture.

The detail description of the disclosure is described by specific embodiments in the following. The scope according to the present invention will not be restricted. The present invention can be also implemented by various other embodiments or applications, the details of this specification can be based on different perspectives and applications, without departing from the spirit according to the present invention various modifications and changes.

Unless the context otherwise stated, the singular form of the specification and the accompanying patent used in the range "a" and "the" include plural individuals.

Unless the context otherwise stated, terms used in the claims and the accompanying manual "or" generally includes "and/or" meaning.

Embodiments

FABRICATION EXAMPLE 1

Fabrication of Au—$CuInS_2$ Nanoparticles

After using $CuxCly$ (0.5 mmol), $InxCly$ (0.5 mmol) (purchased from Alfa Aesar) and 70% oleylamine (12 mL) (purchased from Sigma Aldrich) as precursors and heating them up, thiourea as S precursor (1.0 mmol, purchased from Sigma Aldrich) is added and reacted 1 hour at 260□. After naturally cooling down, the purified $CuInS_2$ nanoparticles with oleylamine attached on their surface, which diameter is between 5 nm to 15 nm, can be obtained by centrifuging at 5000 rpm for 5 min.

FABRICATION EXAMPLE 2

Fabrication of Au—$CuInS_2$ Nanoparticles

Figure 2:
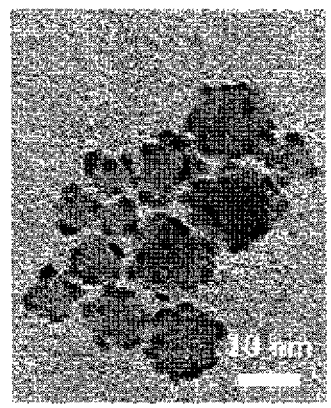
FIG. 2 depicts a transmission electron microscope (TEM) image of the Au—$CuInS_2$ nanoparticles.

Mixing the above $CuInS_2$ nanoparticles (2.2 mmol) with gold chloride (110 μmol) (99.99%) (purchased from Sigma Aldrich), chloroform (8.4 mL) (99.8%) (purchased from J. T. Baker) and 70% oleylamine (3 mL), wherein the mole concentration of gold chloride/$CuInS_2$ is 0.05, the mixture is heated to 60□ and reacted 6 hours. After naturally cooling down, the purified Au—$CuInS_2$ nanoparticles with oleylamine attached on their surface, which diameter is between 7 nm to 23 nm, can be obtained by centrifuging at 5000 rpm for 5 min. As shown in FIG. 2, for the fabricated Au—$CuInS_2$ nanoparticles, there is 54% to 64% Au area covered ratio of on the surface of $CuInS_2$ nanoparticles.

The calculation formula of the area covered ratio is: (the surface area of $CuInS_2$ nanoparticles occupied by the Au nanoparticles/the surface area of $CuInS_2$ nanoparticles)×100%.

EXPERIMENTAL EXAMPLE 1

Light Absorbance Test of Different Nanoparticles

Figure 3:
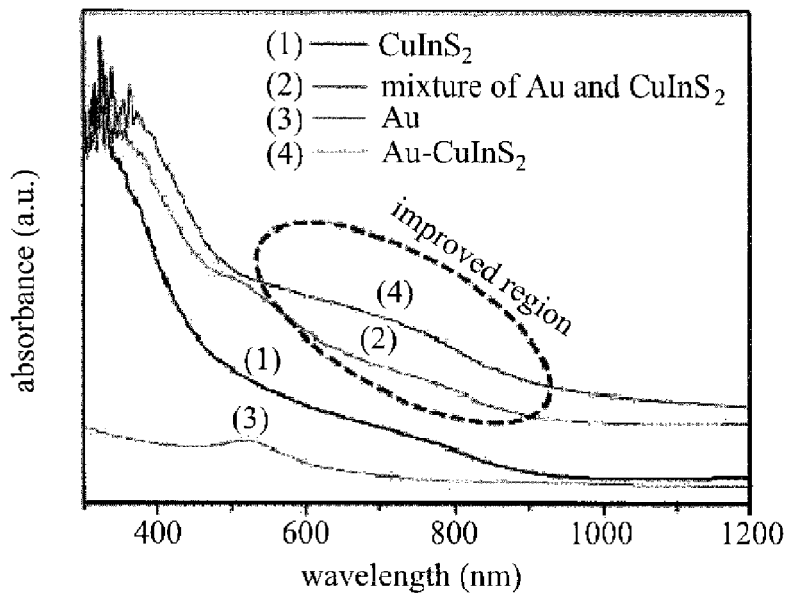
FIG. 3 depicts the absorbance of different nanoparticles under different optical wavelength.

The above fabricated Au—$CuInS_2$ nanoparticles (6.5 mg), $CuInS_2$ nanoparticles (6.5 mg), Au nanoparticles (6.5 mg, synthesized by the method of Chem. Eur. J. 2008, 14, 1584-1591) and the mixture of Au and $CuInS_2$ nanoparticles (6.5 mg, wherein Au and $CuInS_2$ are 3.25 mg, respectively) are irradiated by the light source, Class AAA solar simulator AM 1.5G (solar simulated light testing system), respectively, and their light absorbances are measured. FIG. 3 depicts the absorbance of different nanoparticles under different optical wavelength. As shown in the figure, Au—$CuInS_2$ nanoparticles have the best light absorbance in the visible light region (wavelength from 400 to 800 nm).

EXPERIMENTAL EXAMPLE 2

Solvent Heating Efficiency Test of Different Nanoparticles

Figure 4:
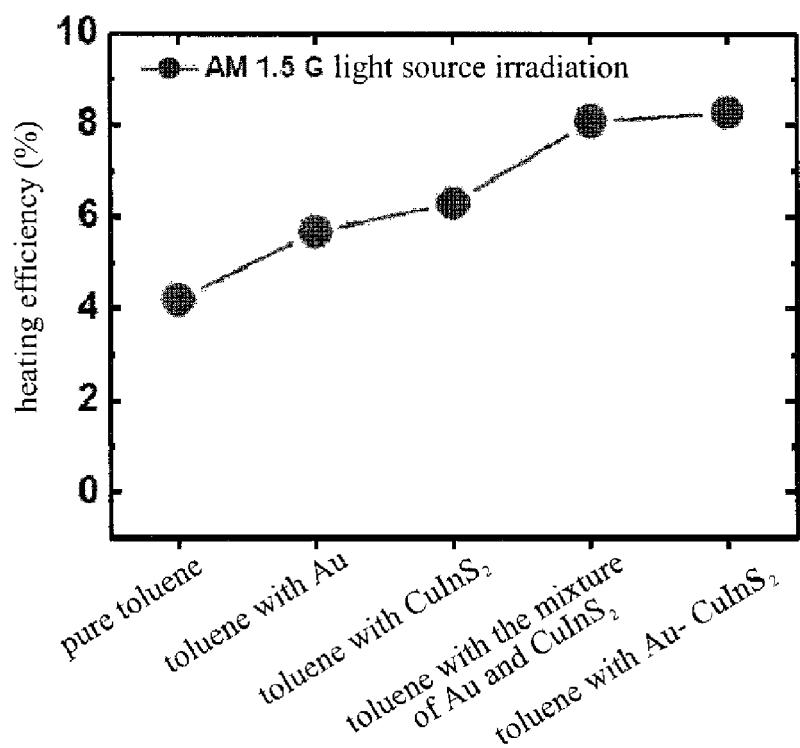
FIG. 4 depicts the mixture heating efficiencies of different nanoparticles.

The above fabricated Au—$CuInS_2$ nanoparticles (6.5 mg), $CuInS_2$ nanoparticles (6.5 mg), Au nanoparticles (6.5 mg, synthesized by the method of Chem. Eur. J. 2008, 14, 1584-1591) and the mixture of Au and $CuInS_2$ nanoparticles (6.5 mg, wherein Au and $CuInS_2$ are 3.25 mg, respectively) are added to a toluene solution (15 ML) (100%), respectively. The respective mixture is ultrasonic oscillated several seconds to uniformly distribute these nanoparticles to the toluene solution. The above toluene solutions having different nanoparticles and the pure toluene solution are irradiated by the light source, Class AAA solar simulator AM 1.5G (solar simulated light testing system), respectively, for three minutes, and the temperature and mass loss during the irradiation are monitored. The result as shown in FIG. 4, the toluene solution having Au—$CuInS_2$ nanoparticles has the best solvent heating efficiency.

The calculation formula of the solvent heating efficiency is: (the energy of heating solvent within the first 30 seconds before reaching the boiling point/the energy of AM 1.5G light source irradiating for 30 seconds)*100%.

In addition, comparing the above fabricated Au—$CuInS_2$ nanoparticles and the mixture of Au and $CuInS_2$ nanoparticles, after seal preserving both of them in toluene and placing them in room temperature for six months, the mixture of Au and $CuInS_2$ nanoparticles produced visible precipitate, but the Au—$CuInS_2$ nanoparticles had no visible precipitate.

EXPERIMENTAL EXAMPLE 3

Test of Solvent Separating by the Au—$CuInS_2$ Nanoparticles

Figure 5:
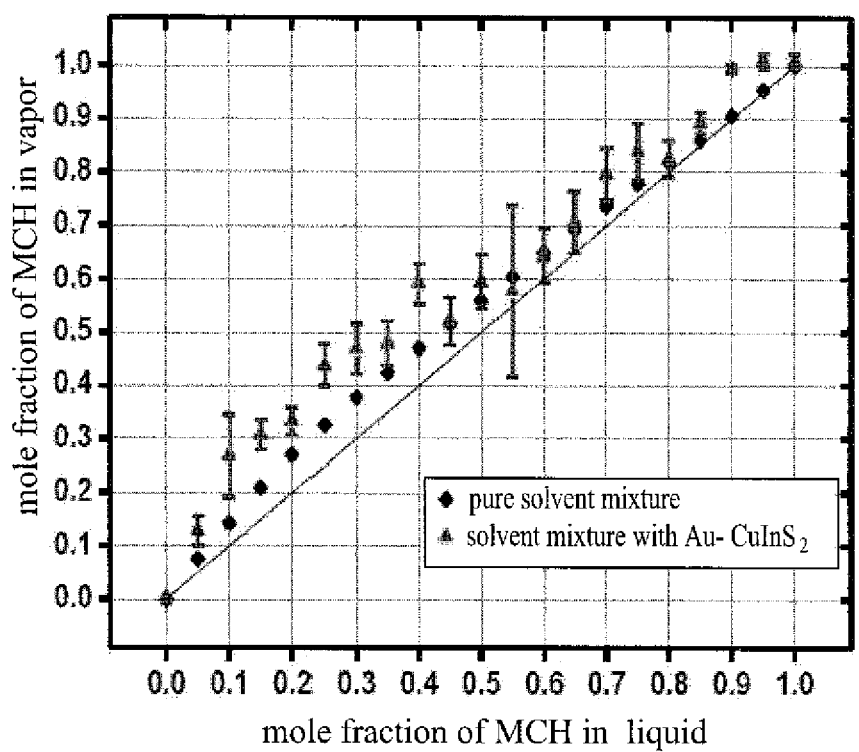
FIG. 5 depicts the mole fraction of MCH gas to MCH liquid in different liquid systems.

The Au—$CuInS_2$ nanoparticles (0.5 g) are added into the mixture of methylcyclohexane (MCH) and toluene with different proportions (1 L), respectively, and placed into a two-neck glass flask. The solvent mixture system is then irradiated by using AM 1.5G (1000 W/m$^2$) light source passing through Fresnel lens (span 260 mm×260 mm, focal length 200 mm), so as to make the solvent mixture system reach 4.5 J/mL and boiling. The same method also applied to irradiate the pure solvent mixture with different proportions (i.e., the solvent mixture system without adding the Au—CuInS$_2$ nanoparticles). The measured mole fraction of MCH gas with respect to MCH liquid of these two systems is shown in FIG. 5. The solvent mixture system having the Au—CuInS$_2$ nanoparticles has higher fraction of MCH gas, i.e., it has better effect on separating MCH solvent.

According to the above results, the complexed nanoparticle material according to the present invention has the best light absorbance and solvent heating efficiency, and the composition according to the present invention has better effect on separating MCH solvent.

What is claimed is:

1. A complexed nanoparticle material, comprising:
   a plurality of chalcopyrite nano cores; and
   a plurality of metal sub-nanoparticles distributed on surfaces of the chalcopyrite nano cores.

2. The complexed nanoparticle material according to claim 1, further comprising dispersants attached on a surface of the complexed nanoparticle material.

3. The complexed nanoparticle material according to claim 2, wherein the dispersants are at least one selected from the group consisting of sodium citrate, aminosilanes, mercapto silanes, and thioglycolic acid.

4. The complexed nanoparticle material according to claim 2, wherein the dispersants are at least one selected from the group consisting of oleylamine, oleic alcohol, and oleic acid.

5. The complexed nanoparticle material according to claim 1, wherein the metal sub-nanoparticles are inlaid on the surfaces of the chalcopyrite nano cores.

6. The complexed nanoparticle material according to claim 1, wherein the metal sub-nanoparticles absorb visible light of a wavelength of from 500 nm to 600 nm.

7. The complexed nanoparticle material according to claim 1, wherein the metal sub-nanoparticles are at least one selected from the group consisting of platinum, silver, and gold nanoparticles.

8. The complexed nanoparticle material according to claim 1, wherein the chalcopyrite nano cores are at least one selected from the group consisting of CuInS$_2$, CuInSe$_2$, Cu(In,Ga)S$_2$, Cu(In,Ga)Se$_2$, CuGaSe$_2$, AgInS$_2$, Cu$_2$ZnSnS$_4$ and Cu$_2$ZnSnSe$_4$.

9. The complexed nanoparticle material according to claim 1, wherein the chalcopyrite nano cores have a diameter greater than a diameter of the metal sub-nanoparticles.

10. The complexed nanoparticle material according to claim 1, wherein the metal sub-nanoparticles have a diameter ranging from 2 nm to 8 nm.

11. The complexed nanoparticle material according to claim 1, wherein the chalcopyrite nano cores have a diameter ranging from 5 nm to 15 nm.

12. The complexed nanoparticle material according to claim 1, wherein the complexed nanoparticle material has a diameter ranging from 7 nm to 23 nm.

13. The complexed nanoparticle material according to claim 1, wherein the metal sub-nanoparticles cover 54% to 64% of the surfaces of the chalcopyrite nano cores.

14. A method for heating liquid comprising using a complexed nanoparticle material according to claim 1.

15. The method according to claim 14, wherein the liquid is seawater.

16. The method according to claim 14, wherein a quantity of the complexed nanoparticle material to be used for heating the liquid is 500 mg to 10,000 mg per liter of the liquid.

17. The method according to claim 14, wherein the complexed nanoparticle material further comprises dispersants attached on a surface of the complexed nanoparticle material, the liquid is a mixture including a liquid medium, the liquid medium has a boiling point lower than boiling points of other ingredients of the mixture, and the dispersants and the liquid medium have similar polarities, as compared to the other ingredients of the mixture.

18. A method for separating a solvent mixture comprising using a complexed nanoparticle material according to claim 1.

19. A method of claim 18, wherein the solvent mixture includes at least two solvents, and at least one of the at least two solvents is distilled and separated by heating the solvent mixture to its boiling point.

20. A method of claim 19, wherein heating the solvent mixture comprises:
   adding the complexed nanoparticle material into the solvent mixture; and
   irradiating and heating the solvent mixture including the complexed nanoparticle material to its boiling point with light passing through a focusing component, so as to separate the at least one of the at least two solvents by distillation.

21. A method of claim 20, wherein the light is at least one selected from the group consisting of sun light, solar simulated light, lamplight bulb light and laser.

22. A method of claim 20, wherein the light has a wavelength ranging from 300 nm to 1,400 nm.

23. A method of claim 20, wherein the light has a wavelength ranging from 500 nm to 850 nm.

24. A method of claim 20, wherein the focusing component is at least one selected from the group consisting of convex lens, parabolic mirror and cylindrical mirror.

25. A method of claim 18, wherein a quantity of the complexed nanoparticle material to be used for separating the solvent mixture is 500 mg to 10,000 mg per liter of the solvent mixture.

26. A method of claim 18, wherein the complexed nanoparticle material further comprises dispersants attached on a surface of the complexed nanoparticle material, and the dispersants and the distillation separated solvent have similar polarities.

* * * * *